(12) United States Patent
Davis et al.

(10) Patent No.: US 10,891,174 B1
(45) Date of Patent: Jan. 12, 2021

(54) PERFORMING HIERARCHICAL PROVENANCE COLLECTION

(71) Applicant: International Business Machines Corporation, Armonk, NY (US)

(72) Inventors: James Collins Davis, Richmond, VA (US); Lukas Rupprecht, San Jose, CA (US); Deepavali Bhagwat, Cupertino, CA (US); Constantine Arnold, San Jose, CA (US); Wayne Sawdon, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/576,279

(22) Filed: Sep. 19, 2019

(51) Int. Cl.
  *G06F 9/44* (2018.01)
  *G06F 9/54* (2006.01)

(52) U.S. Cl.
  CPC .................................. *G06F 9/542* (2013.01)

(58) Field of Classification Search
  CPC ...................................................... G06F 9/542
  USPC ....................................................... 719/318
  See application file for complete search history.

(56) References Cited

U.S. PATENT DOCUMENTS

| 8,099,782 B1 | 1/2012 | Dash et al. |
| 8,825,608 B2 | 9/2014 | Lipstone |
| 2017/0017708 A1 | 1/2017 | Fuchs et al. |
| 2017/0244620 A1 | 8/2017 | Wu et al. |
| 2018/0129712 A1 | 5/2018 | Mankovskii |

FOREIGN PATENT DOCUMENTS

GB 2427490 A 12/2006

OTHER PUBLICATIONS

Borkin et al., "Evaluation of Filesystem Provenance Visualization Tools," IEEE Computer Society, 2013, 10 pages.
Muniswamy-Reddy et al., "Layering in Provenance Systems," USENIX Annual Technical Conference, Jun. 14-19, 2009, 14 pages, retrieved from https://www.usenix.org/conference/usenix-09/layering-provenance-systems.
Ghoshal et al., "Provenance from Log Files: a BigData Problem," ACM, EDBT/ICDT '13, Mar. 18-22, 2013, 8 pages.
Pasquier et al., "Camflow: Managed Data-Sharing for Cloud Services," IEEE Transactions on Cloud Computing, vol. 5, No. 3, Jul.-Sep. 2017, pp. 472-484.
Macko et al., "A General-Purpose Provenance Library," 4th USENIX Workshop on the Theory and Practice of Provenance, Jun. 14-15, 2012, 6 pages, retrieved from https://www.usenix.org/system/files/conference/tapp12/tapp12-final9-revised7-3-12.pdf.

*Primary Examiner* — Timothy A Mudrick

(74) *Attorney, Agent, or Firm* — Zilka-Kotab, P.C.

(57) ABSTRACT

A computer-implemented method according to one embodiment includes identifying an event within a system; applying a model to the event to create an aggregated event; and storing the aggregated event.

20 Claims, 10 Drawing Sheets

PERFORMING HIERARCHICAL PROVENANCE COLLECTION

BACKGROUND

The present invention relates to data analysis, and more specifically, this invention relates to creating provenance information for system data.

Provenance information is valuable to many different analytics applications and can be used to perform such actions as improving system performance and identifying data vulnerabilities. However, provenance-related events are collected across various system layers, and provenance data is often found in many different formats. As a result, current methods for gathering provenance information are complicated and difficult to implement and require manual intervention and review.

SUMMARY

A computer-implemented method according to one embodiment includes identifying an event within a system; applying a model to the event to create an aggregated event; and storing the aggregated event.

According to another embodiment, a computer program product for performing hierarchical provenance collection includes a computer readable storage medium having program instructions embodied therewith, where the computer readable storage medium is not a transitory signal per se, and where the program instructions are executable by a processor to cause the processor to perform a method including identifying, by the processor, an event within a system; applying, by the processor, a model to the event to create an aggregated event; and storing, by the processor, the aggregated event.

According to another embodiment, a system includes a processor; and logic integrated with the processor, executable by the processor, or integrated with and executable by the processor, the logic being configured to identify an event within a system; apply a model to the event to create an aggregated event; and store the aggregated event.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for performing hierarchical provenance collection.

In one general embodiment, a computer-implemented method includes identifying an event within a system; applying a model to the event to create an aggregated event; and storing the aggregated event.

In another general embodiment, a computer program product for performing hierarchical provenance collection includes a computer readable storage medium having program instructions embodied therewith, where the computer readable storage medium is not a transitory signal per se, and where the program instructions are executable by a processor to cause the processor to perform a method including identifying, by the processor, an event within a system; applying, by the processor, a model to the event to create an aggregated event; and storing, by the processor, the aggregated event.

In another general embodiment, a system includes a processor; and logic integrated with the processor, executable by the processor, or integrated with and executable by the processor, the logic being configured to identify an event within a system; apply a model to the event to create an aggregated event; and store the aggregated event.

Figure 1:
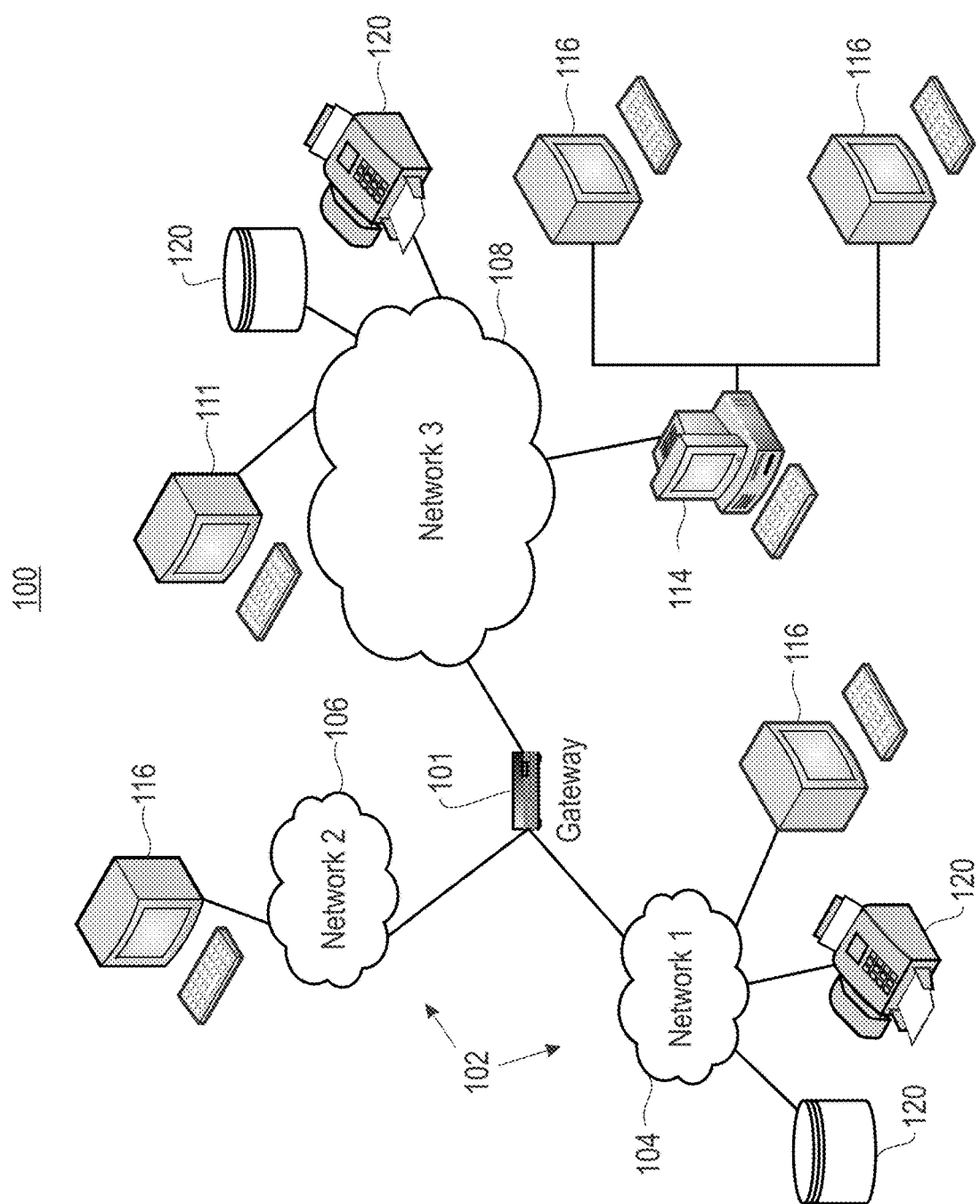
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
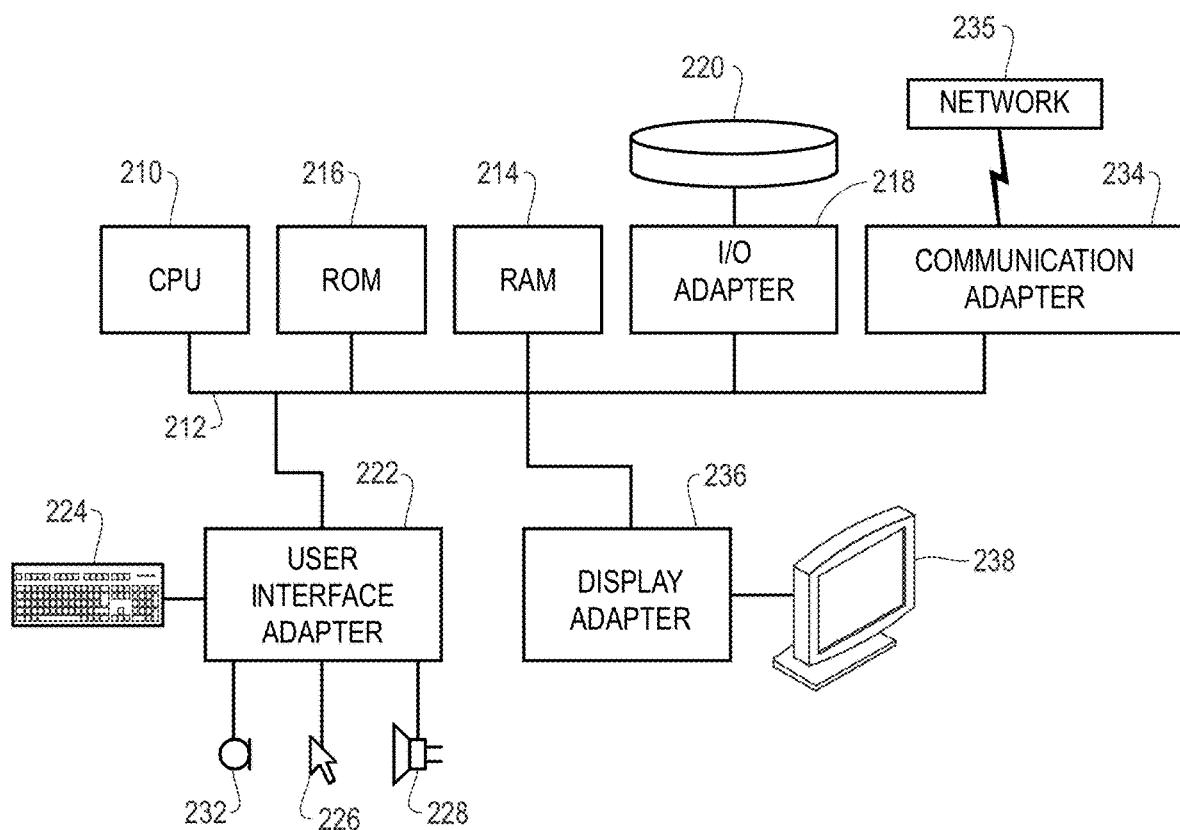
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
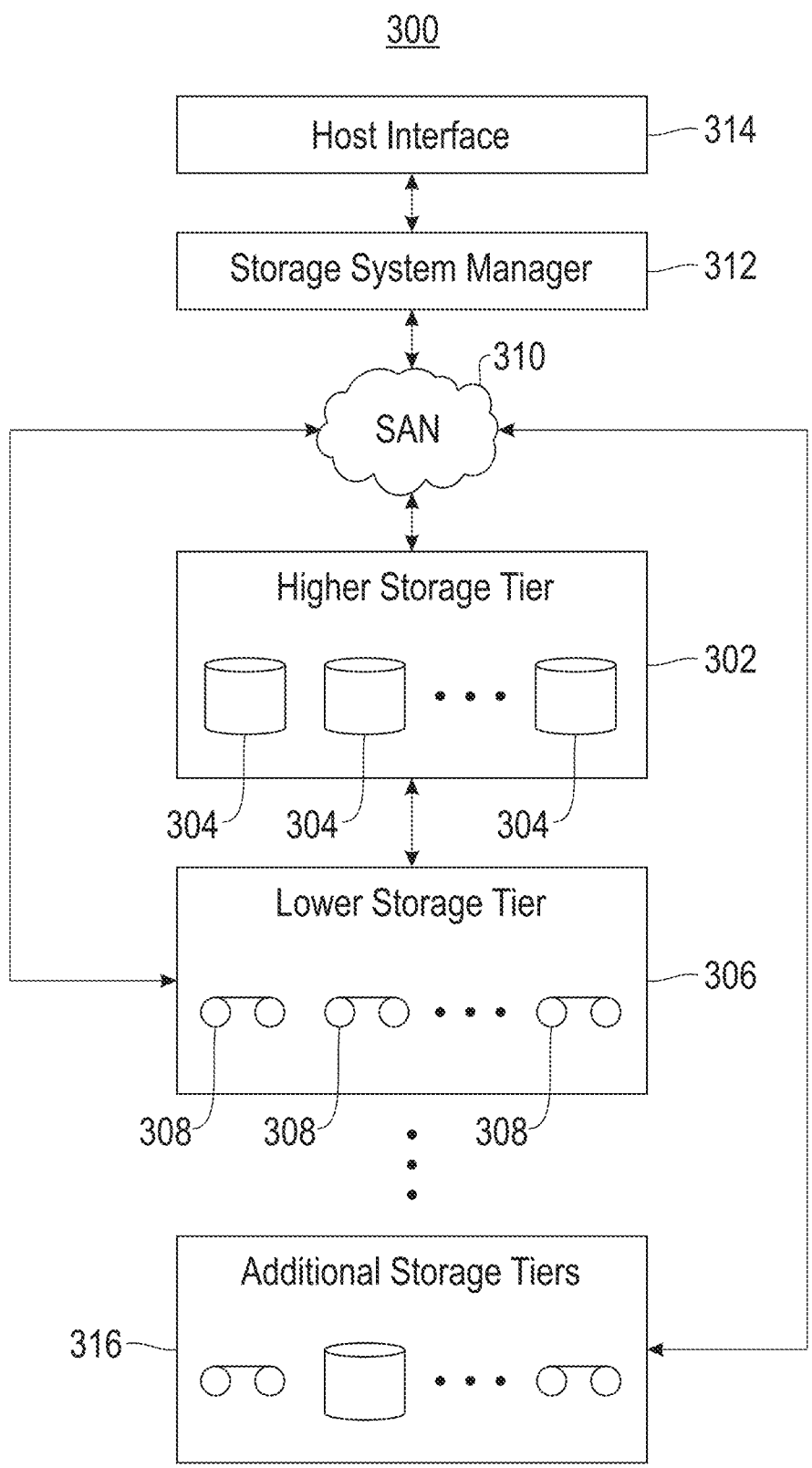
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
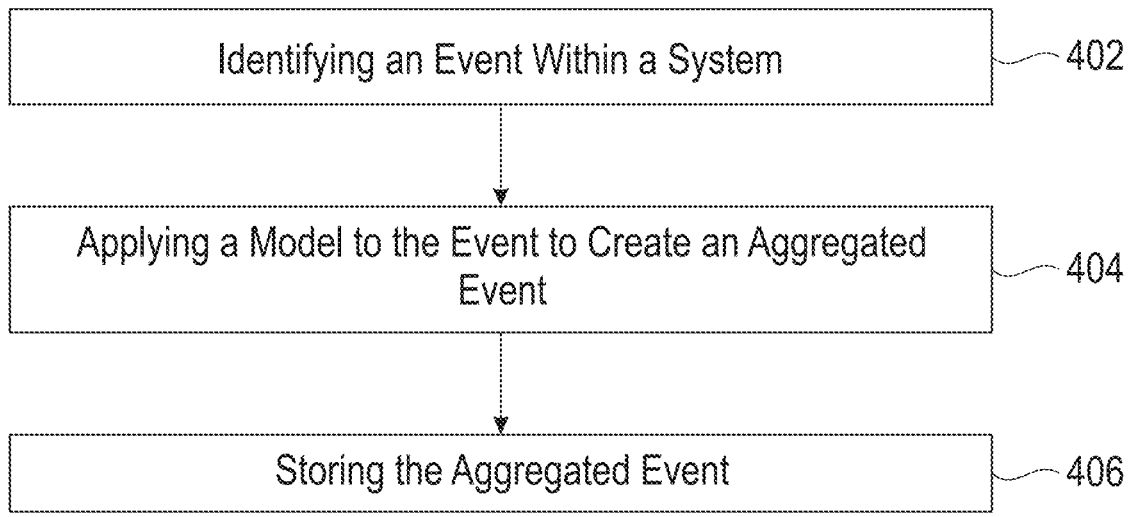
FIG. 4 illustrates a method for performing hierarchical provenance collection, in accordance with one embodiment of the present invention.

Now referring to FIG. 4, a flowchart of a method 400 is shown according to one embodiment. The method 400 may be performed in accordance with the present invention in any of the environments depicted in FIGS. 1-3, and 7-10, among others, in various embodiments. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an event is identified within a system. In one embodiment, the system may include a single computing device (e.g., a computer, a server, a node, etc.). In another embodiment, the system may include a plurality of devices (e.g., a cluster of computing devices and/or storage devices, etc.). In yet another embodiment, the system may include cloud-based processing and/or storage.

Additionally, in one embodiment, the event may include one or more actions performed in association with data. For example, the event may include the creation of data, the editing of data, the deletion of data, the migration of data from one storage device to another, etc. In another example, the event may be linked to a specific instance of data. In yet another example, the event may be linked to a specific component/device within the system.

Further, in one embodiment, the event may include a process implemented by one or more elements within the system. For example, the process may include an operating system process that runs a predetermined application.

In one embodiment, the event may be implemented by one or more event sources of the system. For example, the event sources may include system elements such as a server, a storage device, a network device (e.g., a gateway, a router, etc.), etc. In another embodiment, the event may be identified utilizing one or more monitoring tools (e.g., one or more hooks, one or more daemons, etc.). For example, the one or more monitoring tools may run inside the one or more event sources to produce the event.

Further still, method 400 may proceed with operation 404, where a model is applied to the event to create an aggregated event. In one embodiment, the model may be associated with the event source. For example, each event source within the system may have one or more associated models. In another embodiment, the model may be applied to a plurality of events which are then aggregated according to the model to produce a single output event.

Also, in one embodiment, the model may be associated with a predetermined level of granularity. For example, each event source may have a plurality of associated models, where each of the plurality of associated models has a granularity different from the other associated models. In another example, the predetermined level of granularity may indicate an amount of information to be extracted from the event, where the extracted information is used to create the aggregated event.

In addition, in one example, a first model with a first level of granularity may require the identification of a start and stop time of the event. In another example, a second model with a second level of granularity greater than the first level of granularity may require the identification of a start and stop time of the event, a user associated with the event, any errors encountered during the event, specific system components involved with the event, etc.

In another embodiment, models may be stacked to produce coarser aggregate events. For example, one model may be used to combine a subset of raw events into a first-level event with a first level of coarseness, and this first-level event may be combined with other first-level events to produce a second-level event with a second level of coarseness greater than the first level.

Furthermore, in one embodiment, the model may be conditionally applied to the event if one or more predetermined criteria are met. For example, the model may be applied to the event if one or more aspects of the event (e.g., a type of the event, data associated with the event, etc.) match predetermined criteria associated with the model. In another example, the model may not be applied to the event (and the event may be discarded and not recorded) if one or more aspects of the event do not match predetermined criteria associated with the model.

Further still, in one embodiment, the model may parse the event and extract predetermined information from the event. For example, the predetermined information may include time information (e.g., a start time, stop time, and duration of the event). In another example, the predetermined information may include data information (e.g., data accessed during the event to create a specific instance of data, etc.). In yet another example, the predetermined information may include user information (e.g., a user and/or application that authorized and/or initiated the event, etc.).

Also, in one embodiment, the predetermined information may include any errors that occur during the event. In another embodiment, the predetermined information may include an amount of one or more resources (e.g., processor cycles, processing time, data blocks, network bandwidth, etc.) used during the event. In yet another embodiment, the predetermined information may include configuration changes made to a source, changes to authentication or privileges, etc.

Additionally, in one embodiment, the model may monitor a state of the event during the creation of the aggregated event. For example, model may identify and log a start time of the event. In another example, the model may identify and log an end time of the event. The start time of the event and the end time of the event may then be combined into a single aggregate event. Further, in one embodiment, the model may create the aggregated event by compiling the extracted predetermined information as metadata for the event. For example, a timestamp may be determined and applied to each instance of the extracted predetermined information. In another example, the extracted predetermined information and associated timestamp may be added as metadata to the aggregated event.

In this way, the aggregated event may include a compilation of predetermined information extracted from the event, with associated timestamps. In one embodiment, the model may be created specifically for the event or event source. In another embodiment, the model may be created utilizing a generalized template that is adjusted to apply to a specific event source.

Further still, method 400 may proceed with operation 406, where the aggregated event is stored. In one embodiment, the aggregated event may be stored in association with predetermined data (e.g., the data created, adjusted, migrated, or deleted during the event, etc.). In another embodiment, the aggregated event may be stored within persistent memory (e.g., one or more hard disk drives (HDDs), etc.). In yet another embodiment, the aggregated event may be stored within one or more predetermined databases. In still another embodiment, the aggregated event may be stored with additional aggregated events within a hierarchy.

In this way, the model may identify and extract desired information from identified events and combine different events into a single event. By only extracting and storing desired information from events (instead of the entire event), an amount of stored information may be reduced, which may increase an amount of available storage used for storing provenance information. By only extracting and storing information from events that meet predetermined criteria (and discarding events that do not meet such criteria), and by performing aggregation, an amount of processing performed during model application may be reduced, thereby improving a performance of one or more devices that perform such model application within the system.

Figure 5:
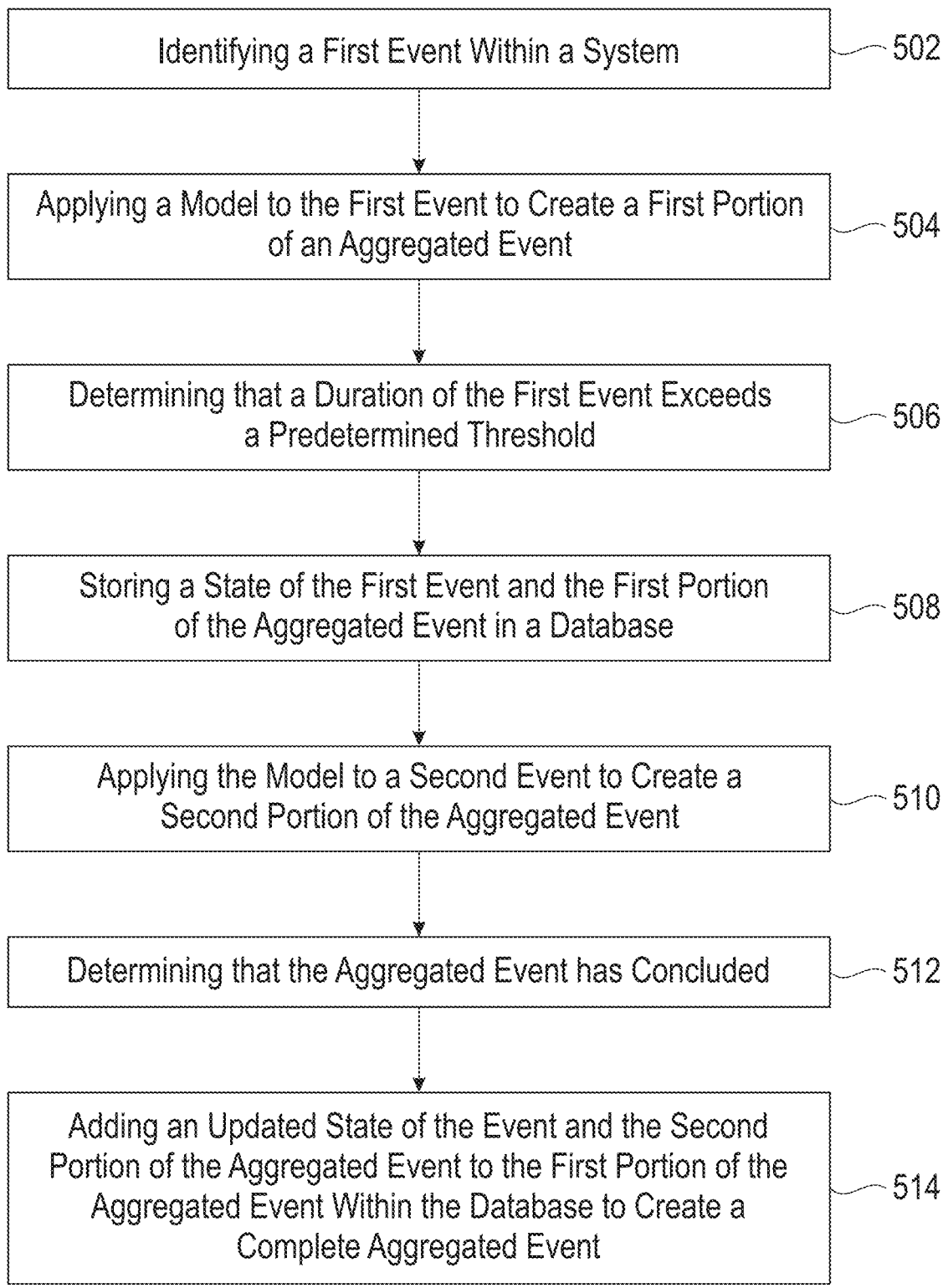
FIG. 5 illustrates a method for accounting for a state of an entity during provenance collection, in accordance with one embodiment of the present invention.

Now referring to FIG. 5, a flowchart of a method 500 for accounting for a state of an entity during provenance collection is shown according to one embodiment. The method 500 may be performed in accordance with the present invention in any of the environments depicted in FIGS. 1-3, and 7-10, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first event is identified within a system. Additionally, method 500 may proceed with operation 504, where a model is applied to the first event to create a first portion of an aggregated event. For example, a timestamp may be identified and added to each instance of predetermined information extracted during the first event. In one embodiment, the first event may include a beginning event.

Further, method 500 may proceed with operation 506, where it is determined that a duration of the first event exceeds a predetermined threshold. Further still, method 500 may proceed with operation 508, where a state of the first event and the first portion of the aggregated event is stored in a database. In one embodiment, timestamp data may also be stored within the database.

Also, method 500 may proceed with operation 510, where the model is applied to a second event to create a second portion of the aggregated event. In one embodiment, a timestamp may be identified and added to each instance of predetermined information extracted during the second event. In one embodiment, the second event may include an end event.

In addition, method 500 may proceed with operation 512, where it is determined that the aggregated event has concluded. Furthermore, method 500 may proceed with operation 514, where an updated state of the event and the second portion of the aggregated event is added to the first portion of the aggregated event within the database to create a complete aggregated event.

Figure 6:
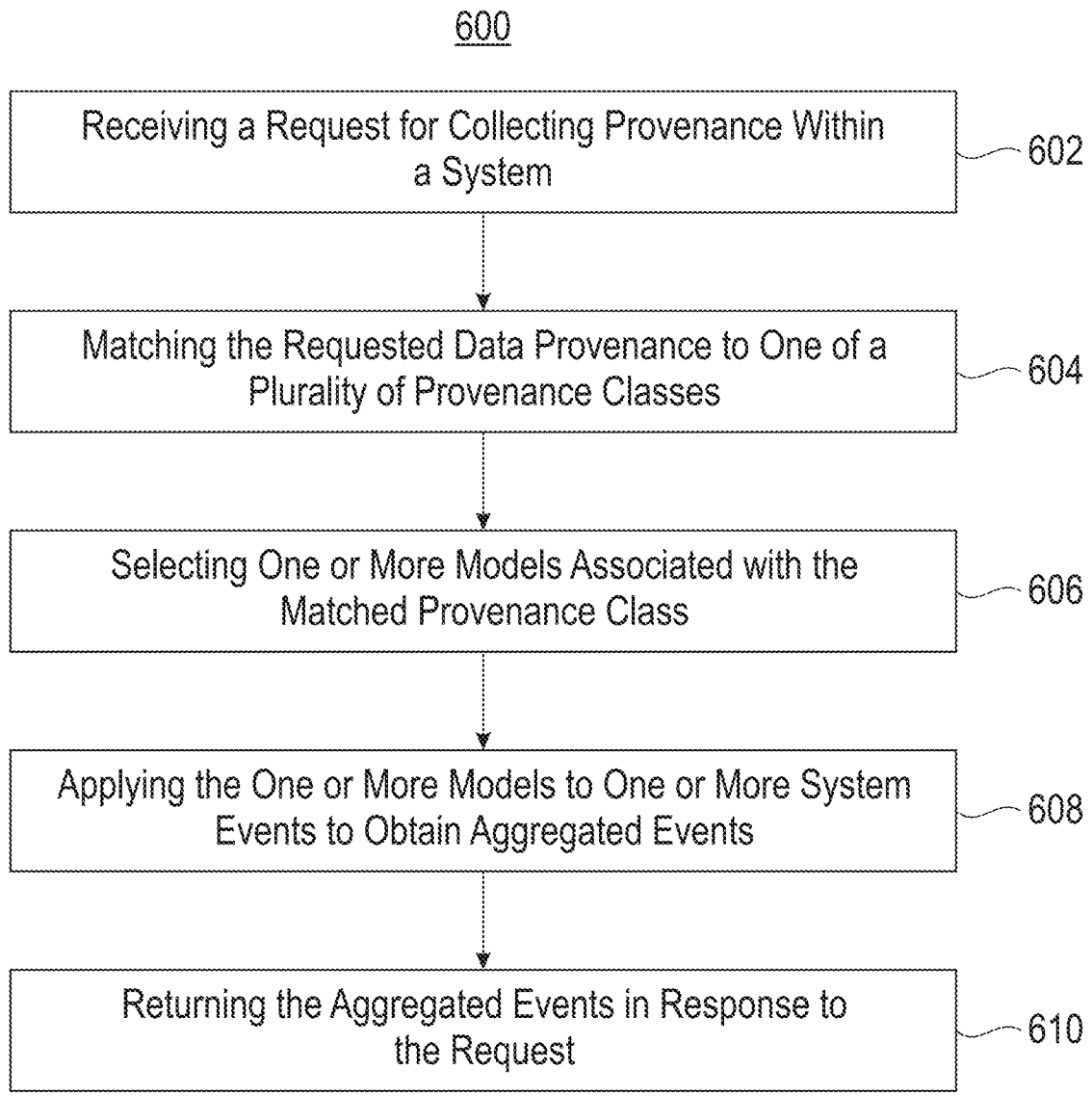
FIG. 6 illustrates a method for providing provenance classes for data, in accordance with one embodiment of the present invention.

Now referring to FIG. 6, a flowchart of a method 600 for providing provenance classes for data is shown according to one embodiment. The method 600 may be performed in accordance with the present invention in any of the environments depicted in FIGS. 1-3, and 7-10, among others, in various embodiments. Of course, greater or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request for collecting provenance within a system is received. In one embodiment, the data provenance may include a history of predetermined data within the system. For example, the data provenance may include one or more of how the data was created, who created the data, additional data used to create the data (e.g., data dependencies, etc.), a software and/or system configuration during the creation of the data, any errors encountered during the creation of the data, one or more resources used to create the data, etc. In another embodiment the data provenance may include a history of a process, a job, a workflow, etc.

Additionally, in one embodiment, the request may include a request to monitor the data within the system to determine the data provenance. In another embodiment, the data may be predetermined data.

Further, method 600 may proceed with operation 604, where the requested data provenance is matched to one of a plurality of provenance classes. In one embodiment, if one or more of read, write, and processing events associated with system data are requested, the request may be matched to a file provenance class. In another embodiment, if one or more of socket, routing, and bandwidth events associated with system data are requested, the request may be matched to a network provenance class. In still another embodiment, if one or more of memory, CPU, GPU, and data usage by entities such as processes, jobs, and threads are requested, the request may be matched to a resource consumption class.

Further still, method 600 may proceed with operation 606, where one or more models associated with the matched provenance class are selected. In one embodiment, each provenance class may be associated with one or more predetermined models. In another embodiment, each of the plurality of provenance classes may have a different granularity than the other provenance classes.

For example, a process provenance class may have a low granularity and may include monitored data from within one or more processes running within the system that created, modified, or deleted predetermined data. In another example, a file provenance class may have a higher granularity than the process provenance class and may include monitored data from within the one or more processes, as well as data from one or more storage devices that stored the data, and date from an operating system detailing the time and date of data creation and modification.

Also, method 600 may proceed with operation 608, where the one or more models are applied to one or more system events to obtain aggregated events. In one embodiment, if a plurality of models are selected, aggregated events from each of the plurality of models may be combined to create a single instance of aggregated events.

In addition, method 600 may proceed with operation 610, where the aggregated events are returned in response to the request.

Event Hierarchies for Efficient and Configurable Provenance Collection

Provenance collection in large-scale analytics environments is important for actions such as bookkeeping, discovery, reproducibility, and problem analysis. Provenance includes information about data such as:

When/how was data created and who created it?
What are the input dependencies for the data creation in terms of data and software/environment?
Were there any errors during data creation?
How many resources did the job consume during the data creation?

Provenance-related events may be collected across layers of a system stack in order to guarantee completeness. These layers include an operating system used within the system, a file system used within the system, one or more applications used within the system, an application orchestrator/scheduler used within the system, etc. Additionally, the events may be integrated to provide a complete provenance graph.

In one embodiment, different provenance sources produce large amounts of event data, such as system calls in the operating system, file access in the file system, scheduled jobs in an orchestrator, etc. Collecting everything is expensive. Additionally, many events are low-level. For example, there is a large variety in event data (e.g. all system calls). Further, users don't have the expertise to accurately configure a collection of provenance data. It is also difficult to decide what is required and shouldn't be collected.

In another embodiment, events are generated in raw format. Also, provenance object lifecycle events are uncorrelated (e.g. process fork, exec, exit or file open, read, read, close). Further, information needs to be correlated at the time the query is created. Further still, raw provenance incurs storage and processing overhead. It is therefore desirable to make provenance collection configurable and to reduce system overhead during provenance retrieval.

A Provenance Event Hierarchy

In one embodiment, events can be aggregated at different granularities to produce an event hierarchy. Higher levels in the hierarchy provide a higher abstraction of the provenance data to make it more accessible. This approach enables a reduction in an amount of collected data by aggregating raw events.

Additionally, in one embodiment, low level events may be abstractly incorporated into higher level constructs which are easier to understand by non-expert users. The event format may also be simplified to improve a storage efficiency and reduce a query complexity. Further, an event hierarchy may be aligned with a storage hierarchy to generate coarser provenance graphs faster.

Figure 7:
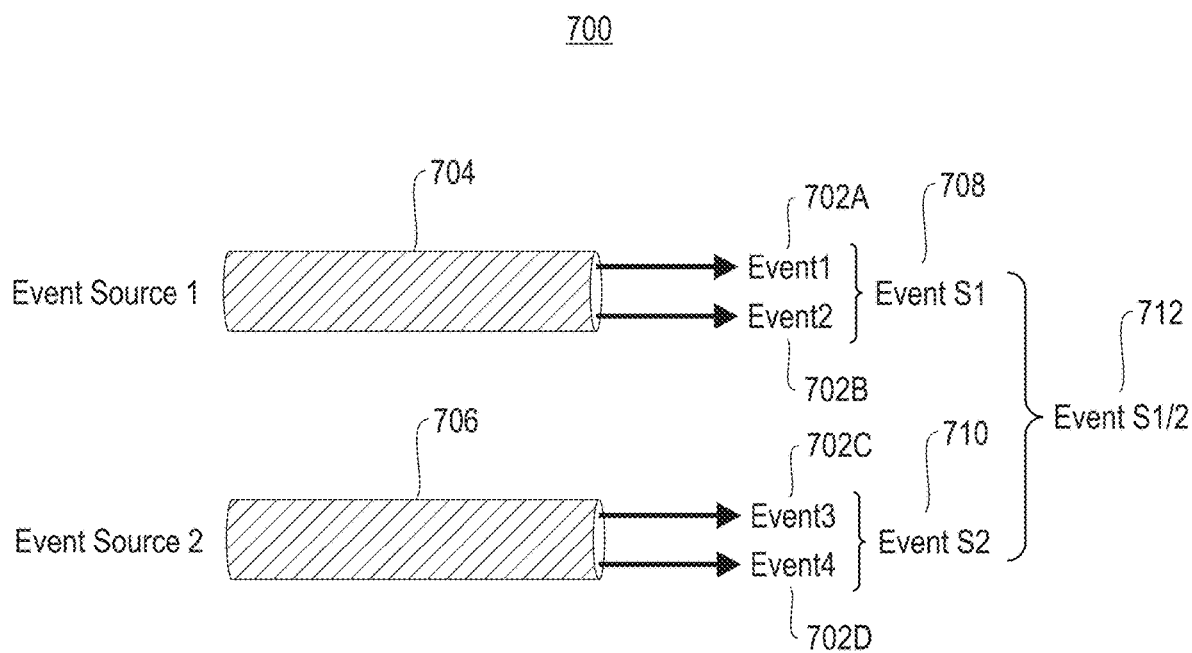
FIG. 7 illustrates an exemplary creation of an event hierarchy, in accordance with one embodiment of the present invention.

FIG. 7 illustrates an exemplary creation of an event hierarchy 700, according to one exemplary embodiment. As shown, first event provenance data 702A-B is collected from a first event source 704, and second event provenance data 702C-D is collected from a second event source 706. The first event provenance data 702A-B is combined to create a first event abstraction level 708, and the second event provenance data 702C-D is combined to create a second event abstraction level 710.

Additionally, the first event abstraction level 708 and the second event abstraction level 710 are combined to create a file provenance event 712. In this way, different levels of abstraction may be created by aggregating provenance event data.

Figure 8:
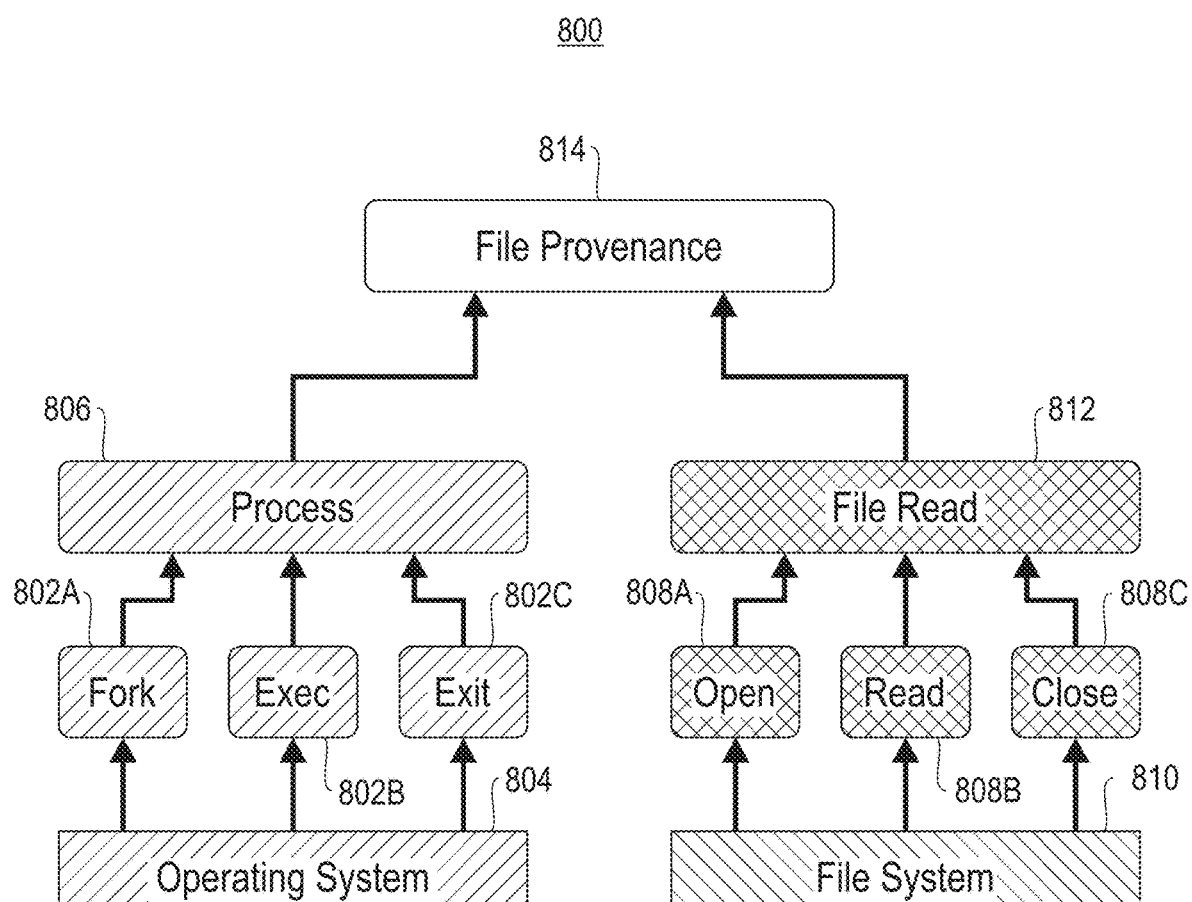
FIG. 8 illustrates an exemplary event hierarchy, in accordance with one embodiment of the present invention.

FIG. 8 illustrates an exemplary event hierarchy 800, according to one exemplary embodiment. As shown, process commands 802A-C made by an operating system 804 are combined to create a single process event abstraction 806. Additionally, file read commands 808A-C made by a file system 810 are combined to create a single file read event abstraction 812.

Further, the process event abstraction 806 and the file read event abstraction 812 are combined to create a file provenance event 814. In one embodiment, multiple file provenance events may be combined to create a job event. In this way, provenance data may be organized so that it may be obtained and retrieved at various levels of granularity.

Event Source Models

In one embodiment, event aggregation may require domain-specific knowledge on the event source, such as the following examples:

A process lifecycle consists of the fork, exec, and exit system calls
A Spark job starts with a "INFO Registered app" log entry and finishes with an "INFO Unregistered app" log entry An operation in a GPFS trace starts with "ENTER Op" and finishes with an "EXIT Op" trace.

This domain-specific knowledge may be provided by using a specific event source model that has specific knowledge about an associated environment in order to obtain desired provenance data. The event source model may also maintain state data and may emit an aggregated event once an entity's lifecycle completes.

Figure 9:
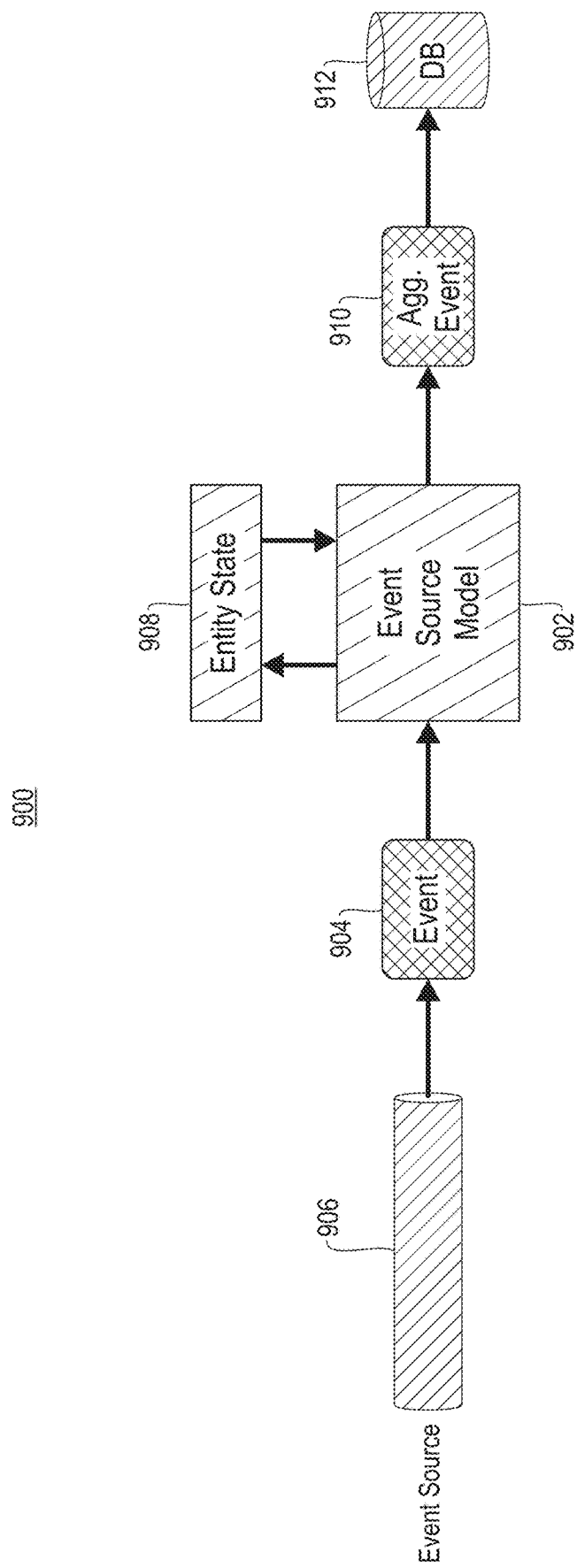
FIG. 9 illustrates an exemplary event source model implementation, in accordance with one embodiment of the present invention.

FIG. 9 illustrates an exemplary event source model implementation 900, according to one exemplary embodiment. As shown, an event source model 902 receives an event 904 from an event source 906 as input. In one embodiment, the event source 906 may include a component of a computing environment. In another embodiment, the event 904 may include a predetermined process.

Further, in response to receiving the event 904, the event source model 902 updates an entity state 908 with an indicator that the event 904 has begun. The event source model 902 then parses and retrieves predetermined information from the event 904, according to domain-specific knowledge implemented within the event source model 902. When it is determined by the event source model 902 that the event 904 has completed, the event source model 902 updates the entity state 908 with an indicator that the event 904 has completed.

Further still, the event source model 902 then creates an aggregated event 910, utilizing the predetermined information, and sends the aggregated event to a database 912 for persistent storage.

In this way, the event source model 902 may create organized data in the form of an aggregated event 910 from unorganized data found within the input event 904.

Storing Entity State

In one embodiment, an entity state may be stored in non-persistent memory (e.g., random-access memory, etc.) for short-lived entities. Longer-lived entity states may be stored in persistent memory (e.g., a database including one or more hard disk drives, etc.) as partially aggregated events.

In this way, partially aggregated events may not delay the retrieval and processing of information, and may allow for early event querying that is completed at a later data to obtain a fully aggregated event.

Figure 10:
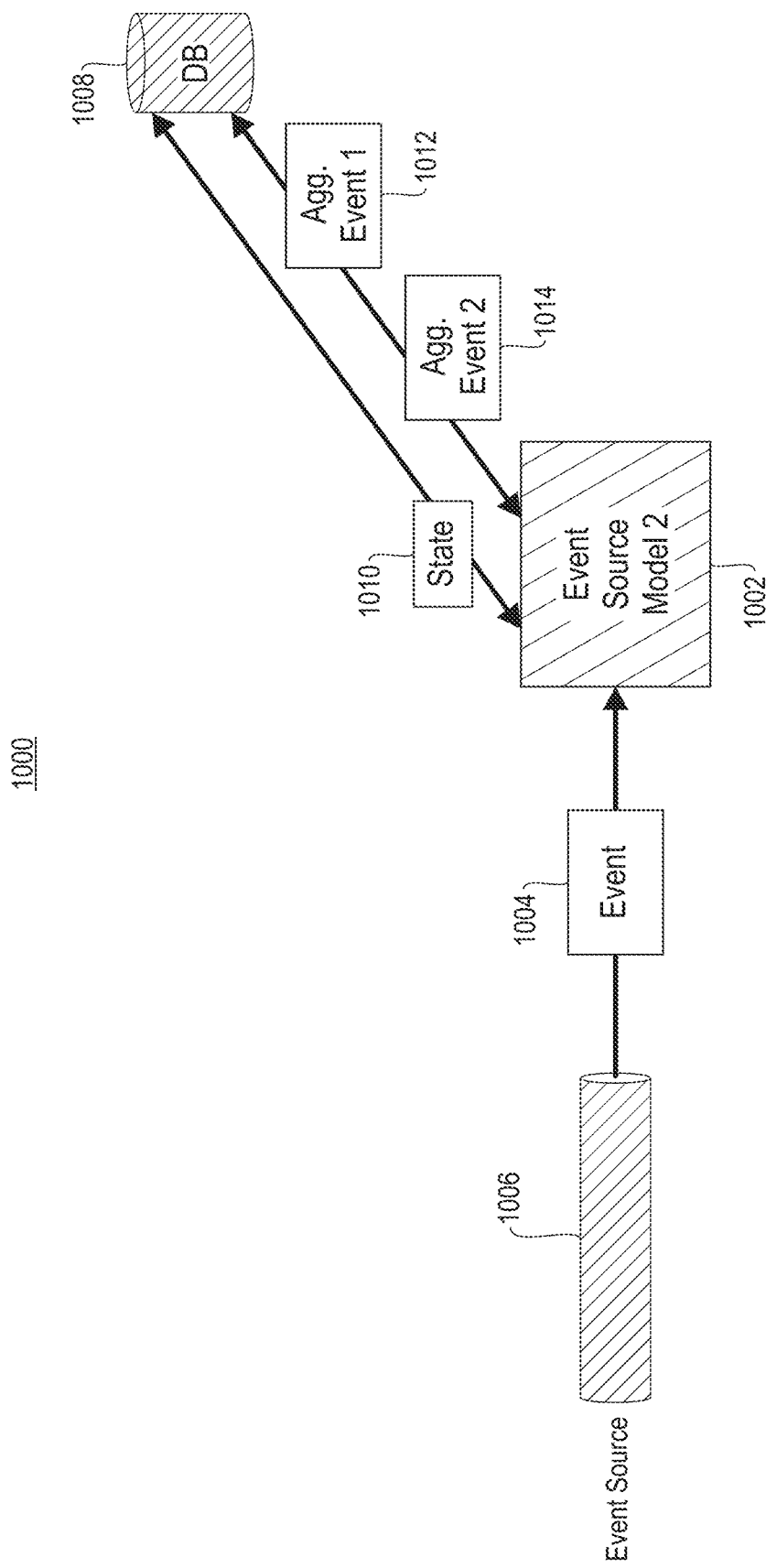
FIG. 10 illustrates an exemplary long-term event processing, in accordance with one embodiment of the present invention.

FIG. 10 illustrates an exemplary long-term event processing 1000, according to one exemplary embodiment. As shown, an event source model 1002 receives an event 1004 from an event source 1006 as input. In one embodiment, the event source 1006 may include a component of a computing environment. In another embodiment, the event 1004 may include a predetermined process.

Further, in response to receiving the event 1004, the event source model 1002 updates a persistent database 1008 with state information 1010 indicating that the event 1004 has begun. In one embodiment, the event source model 1002 may update the persistent database 1008 instead of other non-persistent data in response to determining that the event 1004 is a predetermined event with a duration exceeding a time threshold.

The event source model 1002 then parses and retrieves a first portion of predetermined information from the event 1004, according to domain-specific knowledge implemented within the event source model 1002. The event source model 1002 then creates a first portion of an aggregated event 1012, utilizing the first portion of predetermined information, and sends the first portion of the aggregated event 1012 to the persistent database 1008 for persistent storage.

After the first portion of the aggregated event 1012 has been sent to the persistent database 1008, the event source model 1002 then parses and retrieves a second portion of predetermined information from the event 1004, according to domain-specific knowledge implemented within the event source model 1002. The event source model 1002 then creates a second portion of an aggregated event 1014, utilizing the second portion of predetermined information.

When it is determined by the event source model 1002 that the event 1004 has completed, the event source model 1002 updates the persistent database 1008 with state information 1010 indicating that the event 1004 has completed. The event source model 1002 then sends the second portion of the aggregated event 1014 to the persistent database 1008 for persistent storage, where it is combined with the first portion of the aggregated event 1012.

In this way, the event source model 1002 may create combine portions of aggregated events over time, utilizing state information 1010 maintained in a persistent database 1008.

Specifying Event Source Models

In one embodiment, event sources can be of different complexities. For example, operating and file systems are complex event sources, while a Spark log is a simple event source. Complex event source models may require individual effort to implement. Complex event sources may be fundamental, and models for these sources may be reused across deployments (e.g. for the OS or the file system, etc.).

In another embodiment, simple event source models may be user-specified. For example, a user may specify the format of the aggregated event and a list of lifecycle events to fill the different event attributes. An exemplary simple event source model is shown below in Table 1.

TABLE 1

SparkJob: startTime,endTime
- startTime: EXTRACT 'Registered app' FROM spark-log
- endTime: EXTRACT 'Unregistered app' FROM spark-log As shown above in Table 1, a Spark event is created by obtaining a start time (by extracting a registered app string from a log and looking at a predetermined location within the log) and an end time (by extracting an unregistered app string from a log and looking at a predetermined location within the log) for a job.

Provenance Classes

In one embodiment, aggregated events may be further aggregated to provide provenance classes. For example, process events and file events can be combined to provide a file provenance class. In another example, process events and socket events can be combined to provide a network provenance class. In yet another example, scheduler and workflow manager events may be combined to produce a workflow provenance class.

In another embodiment, different provenance classes enable/disable different event filters in the underlying provenance sources. Classes extend the hierarchy through dependencies between aggregated events (e.g. both file and network provenance may require a process provenance class).

This approach allows for the configuration of provenance collection without a knowledge of the underlying system, while considering a trade-off between a collection overhead and an available provenance. For example, less expressive provenance classes may require a lower processing overhead to obtain, while more expressive provenance classes may require a larger processing overhead.

In one embodiment, a system may produce aggregate events from different provenance sources. The system may generate aggregate events for complex sources based on existing event source models. The system may specify aggregate events for simple event source models.

In another embodiment, a system may support partially aggregated events to reduce a time required to obtain data insight. A system may also combine aggregate events into provenance classes. The system may expose provenance hierarchies based on the classes. The system may also allow a user to select which provenance classes should be collected.

In one embodiment, a system may allow the production of aggregate events from different provenance sources. The system generates aggregate events for complex sources based on existing event source models. The system allows the specification of aggregate events for simple event source models.

The system supports partially aggregated events to reduce time to insight. The system combines aggregate events into provenance classes. The system exposes provenance hierarchies based on the classes. The system allows the user to select which provenance classes should be collected.

In another embodiment, event source models consume events from event sources. The models have entry, update, and exit conditions to know which event triggers the allocation of a new aggregate event, which event updates partially aggregated events, and which events completes an aggregate event and triggers its emission.

Partially aggregated events for short-lived objects are kept in memory while for longer-lived objects, event data is kept in persistent storage (e.g., a database) so that the partially aggregated event is already available for querying.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying an event within a system;
   identifying a plurality of models associated with an event source that implements the event, where each of the plurality of models has a granularity different from the other models;
   selecting one of the plurality of models associated with the event source;
   applying the selected model to the event to create an aggregated event; and
   storing the aggregated event.

2. The computer-implemented method of claim 1, wherein the event includes a process implemented by one or more elements within the system.

3. The computer-implemented method of claim 1, further comprising combining the aggregated event with additional aggregated events to create a combined event with a second level of granularity different from a first level of granularity associated with the selected model.

4. The computer-implemented method of claim 1, wherein the selected model is applied to the event in response to one or more predetermined criteria being met.

5. The computer-implemented method of claim 1, wherein the selected model parses the event and extracts predetermined information from the event.

6. The computer-implemented method of claim 1, wherein the selected model monitors a state of the event during the creation of the aggregated event.

7. The computer-implemented method of claim 1, wherein the selected model creates the aggregated event by compiling extracted predetermined information as metadata for the event.

8. The computer-implemented method of claim 1, wherein the aggregated event is stored within persistent memory.

9. The computer-implemented method of claim 1, wherein the aggregated event is stored with additional aggregated events within a hierarchy, where each of the additional aggregated events is created using a different model associated with the event source having a granularity different from the selected model.

10. The computer-implemented method of claim 1, wherein applying the selected model to the event to create an aggregated event and storing the aggregated event includes:
    applying the selected model to a first event to create a first portion of the aggregated event;
    determining that a duration of the event exceeds a predetermined threshold;
    storing a state of the event and the first portion of the aggregated event in a database;
    applying the selected model to a second event to create a second portion of the aggregated event;
    determining that the event has concluded; and
    adding an updated state of the event and the second portion of the aggregated event to the first portion of the aggregated event within the database to create a complete aggregated event.

11. The computer-implemented method of claim 1, wherein the selected model is one of a plurality of models associated with a provenance class matching a request for data provenance within the system.

12. A computer program product for performing hierarchical provenance collection, the computer program product comprising a computer readable storage medium having program instructions embodied therewith, wherein the computer readable storage medium is not a transitory signal per se, the program instructions executable by a processor to cause the processor to perform a method comprising:

identifying, by the processor, an event within a system;

identifying, by the processor, a plurality of models associated with an event source that implements the event, where each of the plurality of models has a granularity different from the other models;

selecting, by the processor, one of the plurality of models associated with the event source;

applying, by the processor, the selected model to the event to create an aggregated event; and storing, by the processor, the aggregated event.

13. The computer program product of claim 12, wherein the event includes a process implemented by one or more elements within the system.

14. The computer program product of claim 12, further comprising combining, by the processor, the aggregated event with additional aggregated events to create a combined event with a second level of granularity different from a first level of granularity associated with the selected model.

15. The computer program product of claim 12, wherein the selected model is applied to the event in response to one or more predetermined criteria being met.

16. The computer program product of claim 12, wherein the selected model parses the event and extracts predetermined information from the event.

17. The computer program product of claim 12, wherein the selected model monitors a state of the event during the creation of the aggregated event.

18. The computer program product of claim 12, wherein the selected model creates the aggregated event by compiling extracted predetermined information as metadata for the event.

19. The computer program product of claim 12, wherein the aggregated event is stored within persistent memory.

20. A system, comprising:

a processor; and logic integrated with the processor, executable by the processor, or integrated with and executable by the processor, the logic being configured to:

identify an event within a system;

identify a plurality of models associated with an event source that implements the event, where each of the plurality of models has a granularity different from the other models;

select one of the plurality of models associated with the event source;

apply the selected model to the event to create an aggregated event; and store the aggregated event.

\* \* \* \* \*